No. 725,777. PATENTED APR. 21, 1903.
N. ROWE.
SYSTEM OF ELECTRICAL DISTRIBUTION.
APPLICATION FILED JUNE 18, 1897.
NO MODEL.
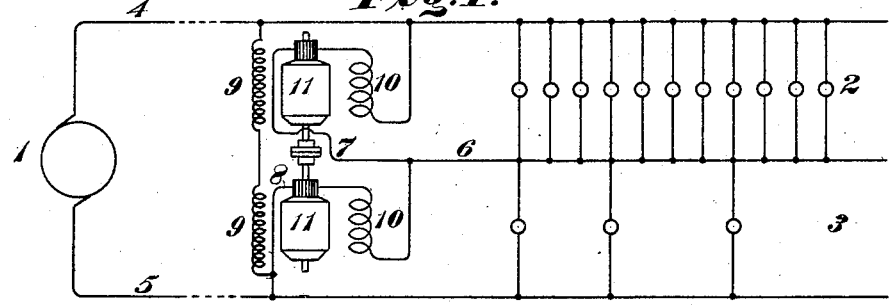
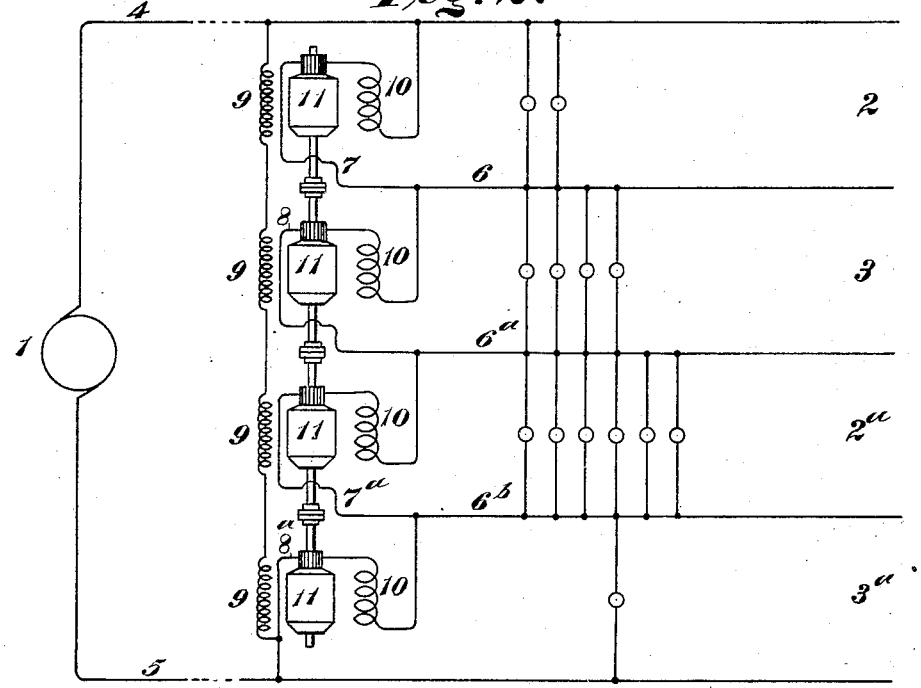

0
UNITED STATES PATENT OFFICE.

NORMAN ROWE, OF WILKINSBURG, PENNSYLVANIA, ASSIGNOR TO THE WESTINGHOUSE ELECTRIC & MANUFACTURING CO., A CORPORATION OF PENNSYLVANIA.

SYSTEM OF ELECTRICAL DISTRIBUTION.

SPECIFICATION forming part of Letters Patent No. 725,777, dated April 21, 1903.

Application filed June 18, 1897. Serial No. 641,273. (No model.)

*To all whom it may concern:*

Be it known that I, NORMAN ROWE, a citizen of the United States, residing in Wilkinsburg, in the county of Allegheny and State of Pennsylvania, have invented a new and useful Improvement in Systems of Electrical Distribution, of which the following is a specification.

My invention relates to systems of electrical distribution, and more particularly to such systems as embody one or more neutral or balancing conductors in conjunction with the main conductors of the distributing or working circuit.

My invention has for one of its objects to provide a system which shall dispense with the plurality of generators heretofore employed at the central or power station in cases where balancing-conductors have been used.

A further object of my invention is to dispense with the balancing conductor or conductors except at the load end of the circuit.

A further object of my invention is to provide a method and a means for automatically adjusting the current in accordance with the load, and also to provide mechanical power for utilization, as may be desired.

In the accompanying drawings, Figure 1 is a diagram of a three-wire system of distribution embodying my invention, and Fig. 2 is a similar diagram of a five-wire system of distribution embodying my invention.

The details of construction in so far as such details are essential to practicing the invention are set forth in the following description.

Referring particularly to Fig. 1, 1 is a direct-current generator located at the central or power station, and 2 and 3 are sets of translating devices connected in multiple series with the distributing-mains 4 5. These translating devices are indicated diagrammatically as incandescent lamps; but they may obviously be of any character suitable for operation by means of the current and electromotive force supplied to the circuit by the generator 1. The two sets of translating devices 2 and 3 are connected at one side to a neutral or balancing conductor 6, as is usual in three-wire systems of distribution. Instead of extending this balancing-conductor 6 to the central station and connecting the same between two generators, as has been the usual practice heretofore, I propose to locate at the load end of the circuit near such sets of translating devices two motors 7 and 8, the armatures of which are either rigidly connected together or are belted or otherwise geared together or to a single shaft, so as to run at either substantially the same speed or at different speeds, the ratio of which is substantially constant. Each of these motors is provided with a shunt field-magnet winding 9 and with a series field-magnet winding 10. The balancing-conductor 6 is connected at one end to the armature of one of the motors and to the outer terminal of the series field-winding 10 the other motor.

The shunt-windings 9 may be connected in series with each other around the armature and series windings of the two machines, as shown, or both of said shunt-windings may be connected directly to the neutral conductor 6.

The construction illustrated diagrammatically in Fig. 2 is similar to that illustrated in Fig. 1, there being a single central station generator 1, distributing-mains 4 5, and sets of translating devices 2, 3, 2ª, and 3ª, connected in multiple series. There being three neutral or balancing conductors 6, 6ª, and 6ᵇ in this organization, there are necessarily four motors 7, 8, 7ª, and 8ª, the shunt field-windings 9 of such motors being connected in series around all of the armature and series field-windings 10, as shown, or, if desired, they may be connected directly to the adjacent balancing-conductors. In this system, as well as in that illustrated in Fig. 1, the circuit connections are such that when any one of the machines 7, 8, 7ª, and 8ª is running as a motor its series winding acts in opposition to its shunt-winding, and when the machine is running as a generator such windings act together and constitute the well-known compound winding. By reason of the differential action of the two windings when the machine is operating as a motor the combined shunt and series coils will be hereinafter designated as a "differential winding"

and the machines as "differential motor" or as "differentially-wound motors."

The operation of the system is as follows: When there is no load upon the system or when the loads are equally balanced, the machines 7 8 and 7ª 8ª will all run as differential motors and will provide mechanical power. If, however, the load is decreased upon one side or increased upon the other, the machine connected across the more lightly-loaded side will continue to run as a differential motor, while the other machine will run as a generator, since the series coil of the latter is so connected as to cause the machine to overcompound, and the series coil of the machine running as a motor is so connected as to cause that machine to increase in speed under an increase in load. Thus by properly proportioning the series turns an approximately perfect balance of the voltage on the two sides may be obtained. It has been found in practice that the proportion of unbalancing which can be taken care of by this organization is equal to the combined rating of the two machines when used entirely to regulate their voltage or to their combined rating less the power delivered to some outside system when the machines are running partly as motors and partly for balancing purposes. It has been found by practical tests that this arrangement will maintain the voltages on both sides of the three-wire system substantially equal when the two motors are used partially for driving other machinery and partially for balancing purposes, no adjustment being necessary between the condition of no load and that of fifty per cent. overload.

It will be readily seen that with this system the necessity of double units in series at the central station no longer exists, a single unit of twice the size being substituted therefor, and the middle wire from the power-house to the point of distribution being dispensed with. The higher efficiency of the larger units in the central station and the absence of losses incident to a long neutral or balancing wire will more than compensate for the losses incident to the employing of balancing-motors at the load end of the circuit. The cost of installation will also in general be less with this system than with the regular three-wire system, the smaller cost per horse-power of the larger units and the material saving in copper by reason of the omission of the middle wire except at the consumption end of the circuit being sufficient to more than offset the cost of the small motors necessary for balancing the circuit.

This system is especially applicable to installations where the lighting or other unbalanced loads come at the time of day when the motor-load is at a minimum. In such cases where the same machines are used for balancing and for power little or no margin need be allowed on account of unbalanced loads.

I desire it to be understood that my invention is not limited to the details of construction illustrated and described except in so far as limitations are imposed by the state of the art.

I claim as my invention—

1. In a system of electrical distribution, a direct-current generator, a distribution-circuit supplied thereby, translating devices connected in multiple series in said circuit, two motors having no mechanical connection with a source of power and having their armatures mechanically connected to rotate together and their armature and series field-magnet coils connected in series across said distribution-circuit and their shunt field-magnet coils connected in series with each other around said series field-magnet coils in combination with a neutral or balancing conductor connected to the armature and series field-magnet circuits intermediate said motors.

2. In a system of electrical distribution, a direct-current generator, a distribution-circuit supplied thereby, translating devices connected in multiple series remote from said generator, a plurality of motors located near said translating devices and having their armatures mechanically connected to rotate together and having armature and low-resistance field-magnet coils connected in series across the distribution-circuit and high-resistance field-magnet coils connected in series around said armature and low-resistance field-magnet coils, in combination with one or more balancing or neutral conductors connected to the armature and low-resistance field-magnet circuit between the motors.

In testimony whereof I have hereunto subscribed my name this 17th day of June, 1897.

NORMAN ROWE.

Witnesses:
  WESLEY G. CARR,
  H. C. TENER.